United States Patent
Yang (10) Patent No.: US 7,044,440 B2
(45) Date of Patent: May 16, 2006

(54) OUTFALL VALVE STRUCTURE CONFORMING TO ERGONOMICS

(76) Inventor: Shih-Sheng Yang, P.O. Box 82-144, Taipei Hsien (TW)

( * ) Notice: Subject to any disclaimer, the term of this patent is extended or adjusted under 35 U.S.C. 154(b) by 109 days.

(21) Appl. No.: 10/806,185

(22) Filed: Mar. 23, 2004

(65) Prior Publication Data

US 2005/0211943 A1   Sep. 29, 2005

(51) Int. Cl.
*F16K 15/00* (2006.01)
(52) U.S. Cl. .................. 251/145; 251/325; 251/340; 251/353
(58) Field of Classification Search .......... 251/145, 251/325, 340, 353
See application file for complete search history.

(56) References Cited

U.S. PATENT DOCUMENTS

| | | | | |
|---|---|---|---|---|
| 973,663 | A * | 10/1910 | Jacobs | 251/325 |
| 1,397,220 | A * | 11/1921 | Lord | 137/590 |
| 1,458,718 | A * | 6/1923 | Lord | 137/590 |
| 1,536,630 | A * | 5/1925 | Reinecke | 431/90 |
| 2,906,492 | A * | 9/1959 | Conrad | 251/325 |
| 3,578,285 | A * | 5/1971 | Carlton | 251/218 |
| 5,244,277 | A * | 9/1993 | Broussalian et al. | 374/141 |
| 6,651,901 | B1 * | 11/2003 | Jones | 239/99 |
| 6,902,144 | B1 * | 6/2005 | deCler | 251/149.8 |

* cited by examiner

Primary Examiner—Justine R. Yu
Assistant Examiner—Peter deVore
(74) Attorney, Agent, or Firm—Leong C. Lei (57) ABSTRACT

An outfall valve structure conforming to ergonomics is primarily composed of a casing, which is moveably connected with a hollow pipe. The casing is in the form of a short pipe, the exterior wall thereof is provided with a coupler with an opening provided on the bottom such that the casing would become a tee; whereas the interior wall thereof is provided with a circle of hollow flow path along the position where the opening is. The hollow pipe is provided with a hook at one end of its pipe wall, and with a coupler at the other end. A barrier edge and an opening are provided between the hood and the coupler, such that the hollow pipe can be inserted into the casing with the end having a hook, thereby the casing can slidably move on the hollow pipe without detaching from the hollow pipe since it is stopped by the barrier edge and the hook. Accordingly, when the present invention is combined with a nozzle, provided that the outlet crevice of the nozzle does not present vertical, the hollow pipe can be rotated to make the outlet crevice become vertical to ease a user to bite the nozzle for drinking water.

2 Claims, 8 Drawing Sheets

OUTFALL VALVE STRUCTURE CONFORMING TO ERGONOMICS

BACKGROUND OF THE INVENTION (a) Technical Field of the Invention

The present invention relates to an outfall valve structure conforming to ergonomics, particularly to one with a specific angle formed between the water inlet end and the water outlet end, such that one end of the outfall valve can be connected with a nozzle for drinking water. The invention is applicable to a portable water pouch for outdoor sports, such as water pouches for cyclists, mountaineers, etc.

(b) Description of the Prior Art

Water bags for sport purposes are commonly used nowadays. Taking the outfall valve for a sports water bag as disclosed in prior art U.S. Pat. No. 6,085,947 as an example, said invention primarily comprises a bag for containing liquid. The bottom of the bag is connected with a water conduit, which is provided with a nozzle at the end. The bag can be carried on the user's back and can allow the user to drink the liquid any time from the nozzle through the connection and extension of the water conduit. In the outfall valve structure of said invention, as the inlet end and the outlet end are in alignment, the outfall valve provided between the water conduit of the water bag and the nozzle is not conformed to ergonomics requirement, since the outfall directs from the user's back toward front, the user must bend the water conduit back to close to his/her mouth for drinking.

As the outfall valve used in the sports water bags of the prior art is in a linear form, the water conduit and the nozzle are combined in alignment. While the water bag is carried on the user's back, the user can bit the nozzle and drink the water from the water bag through the water conduit, which is flexible and bendable. Besides, the outlet crevice of the nozzle is usually in a upstanding line. When the user's mouth bit on it, the outlet crevice would open toward left and right, thereby the liquid contained in the water bag can be released for drinking by the user. However, since when the nozzle is combined with the water conduit, the direction of the outlet crevice can be sure, it is necessary to switch the nozzle to make the outlet crevice become upstanding such that the water can be released when the user's mouth bits on it.

Although the water conduit is flexible and can be freely bended, and the nozzle can be switched to ease the user to drink water, there must be certain limitation regarding the flexibility of the water conduit, overly bending the water conduit will affect the flow rate of the liquid to become less, rendering the user unable to freely drink the liquid from the water bag. Meanwhile, in order to keep the outlet crevice of the nozzle vertical, there must be corresponding force generated on the user's mouth since he/she must bite the nozzle by more force. This could be the primary disadvantage of the prior art.

In view of the above disadvantage existing in the prior art, the inventor researched and invented an outfall valve conforming ergonomics, which does not require bending the water conduit or switching the nozzle at the time of use.

SUMMARY OF THE INVENTION

The primary object of the invention is to provide an outfall valve structure conforming to ergonomics, which does not require bending the water conduit, nor switch the nozzle by force for use. The user can easily drink the liquid from the water bag.

The secondary object of the invention is to provide an outfall valve structure conforming to ergonomics, which includes an outfall valve structure combinable to a nozzle.

Yet a further object of the invention is to provide an outfall valve structure conforming to ergonomics, in which the combined nozzle and water conduit can be rotated in a 360-degree angle, thereby the outlet crevice can be easily adjusted to be vertical.

To achieve the above objects, the invention discloses an outfall valve structure conforming to ergonomics, which comprises: a casing and a hollow pipe. The casing is in the form of a short pipe, the exterior wall thereof is provided with a coupler with an opening provided on the bottom such that the casing would become a tee; whereas the interior wall thereof is provided with a circle of hollow flow path along the opening. The hollow pipe is provided with a hook at one end of the wall, and with exterior threads at the other end for connecting with a nozzle. A barrier edge and an opening are provided between the hood and the exterior threads, while an O-ring is mounted on each peripheral groove, such that when the hollow pipe is inserted into the casing with the end having a hook, the casing can slidably move on the hollow pipe without detaching from the hollow pipe since it is stopped by the barrier edge and the hook. Accordingly, when the present invention is combined with a nozzle, provided that the outlet crevice of the nozzle does not present vertical, the hollow pipe can be rotated to make the outlet crevice become vertical to ease a user to bite the nozzle for drinking water. And after the use finishes drinking, he/she can move back the hollow pipe to make the two openins depart from each other, thereby closing the flow path and avoid the liquid from leaking out of the nozzle.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
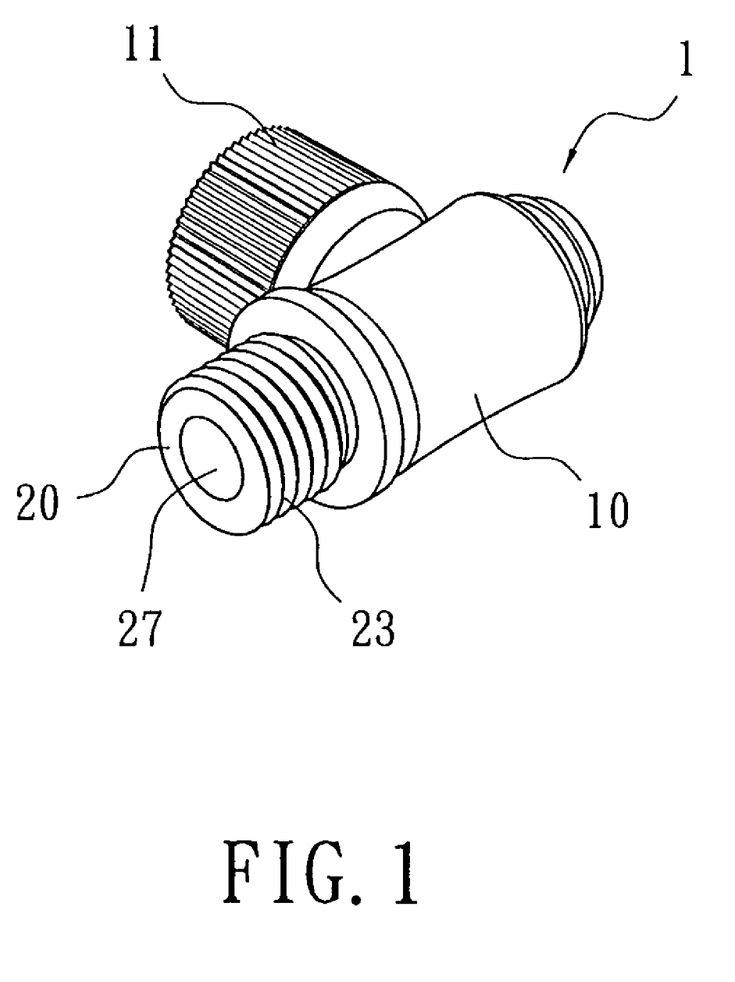
FIG. 1 is a perspective view of the present invention.
Figure 2:
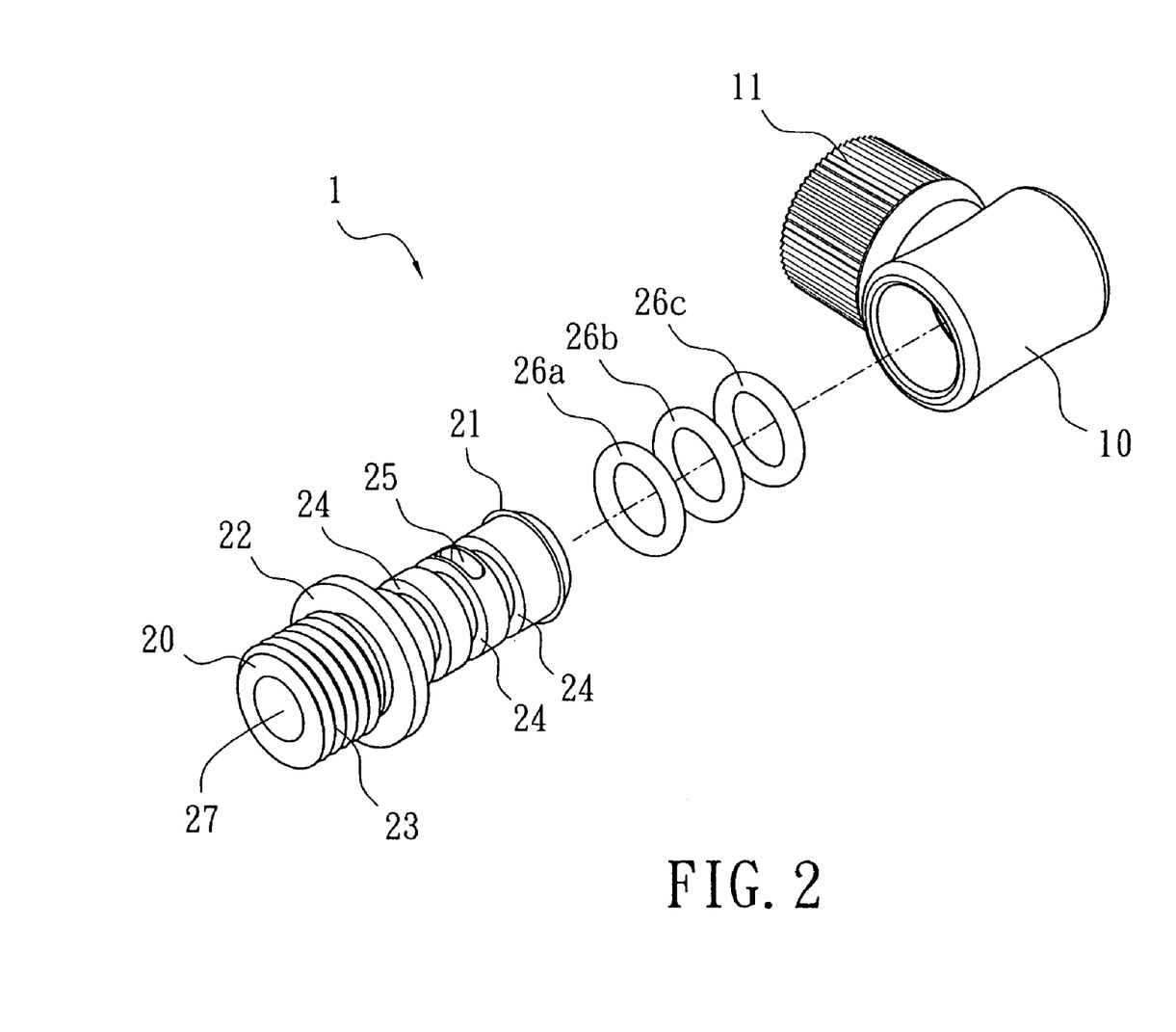
FIG. 2 is an exploded view of the present invention.
Figure 3:
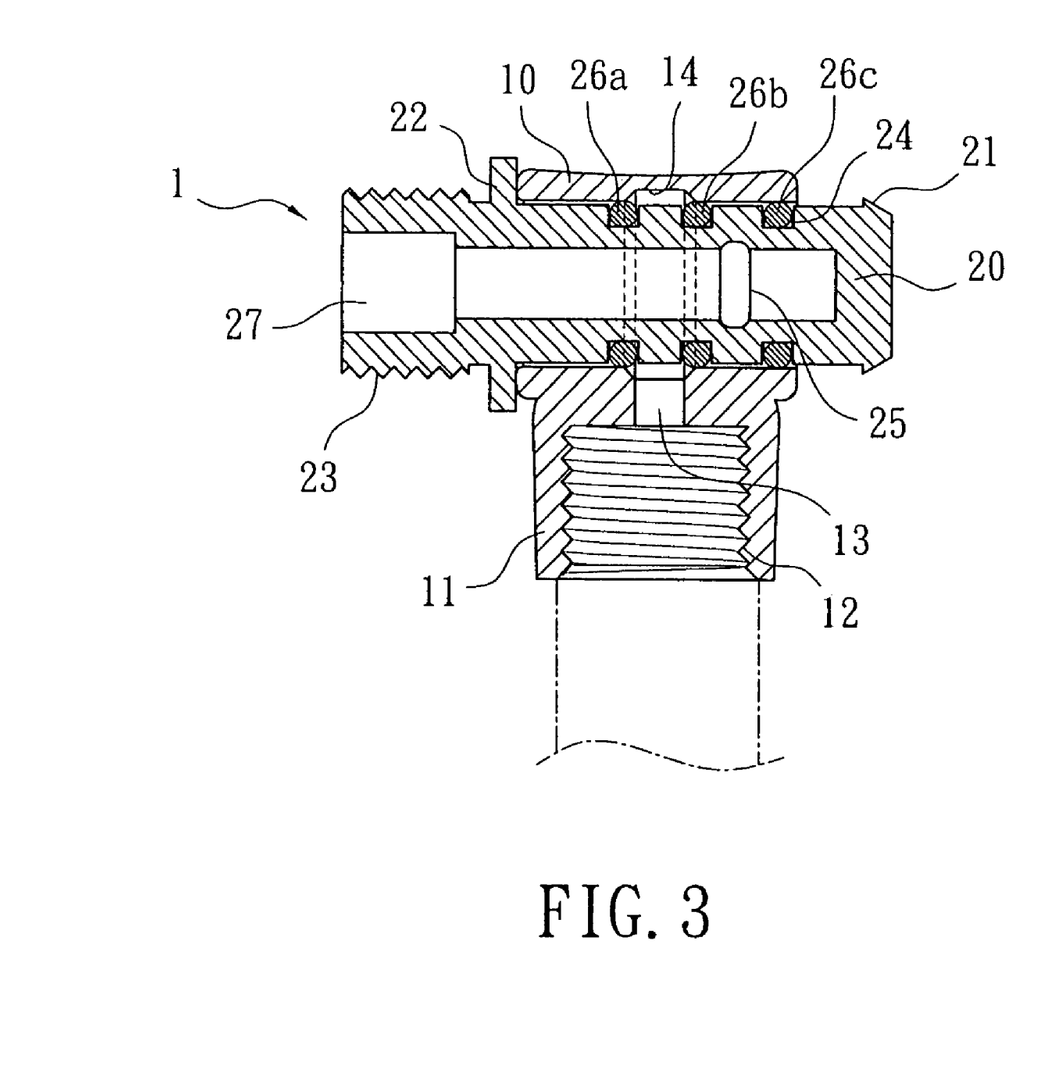
FIG. 3 is a cut-away view showing the invention in assembly.

Referring to FIGS. 1 to 3, the outfall valve 1 according to the present invention is composed of a casing 10, which is connected with a hollow pipe 20. The casing 10 is in the form of a short hollow pipe, the exterior wall thereof is provided with a coupler 11, the bottom of which is provided with an opening 13 (as shown in FIG. 3). A circle of hollow flow path 14 (as shown in FIG. 3) is provided along the opening 13 of the interior wall of the casing 10. The hollow pipe 20 is provided with a blunt hook 21 at one end of the exterior wall, and with exterior threads 23 at the other end for screw purposes. A barrier edge 22 is protrudingly provided at the position adjacent to the exterior threads 23, while three peripheral grooves 24 and an opening 25 are provided on the hollow pipe 20 at the position between the barrier edge 22 and the hook 21. The opening 25 can go through the interior flow path 27 of the hollow pipe 20, while each of the peripheral grooves 24 is mounted with an O-ring (26a, 26b, 26c). By way of inserting the hollow pipe 20 into the casing with the end having the hook 21, the casing 10 can slidably move on the hollow pipe 20 between the barrier edge 22 and the hook 21, thereby accomplishing the assembly of the invention.

Figure 5:
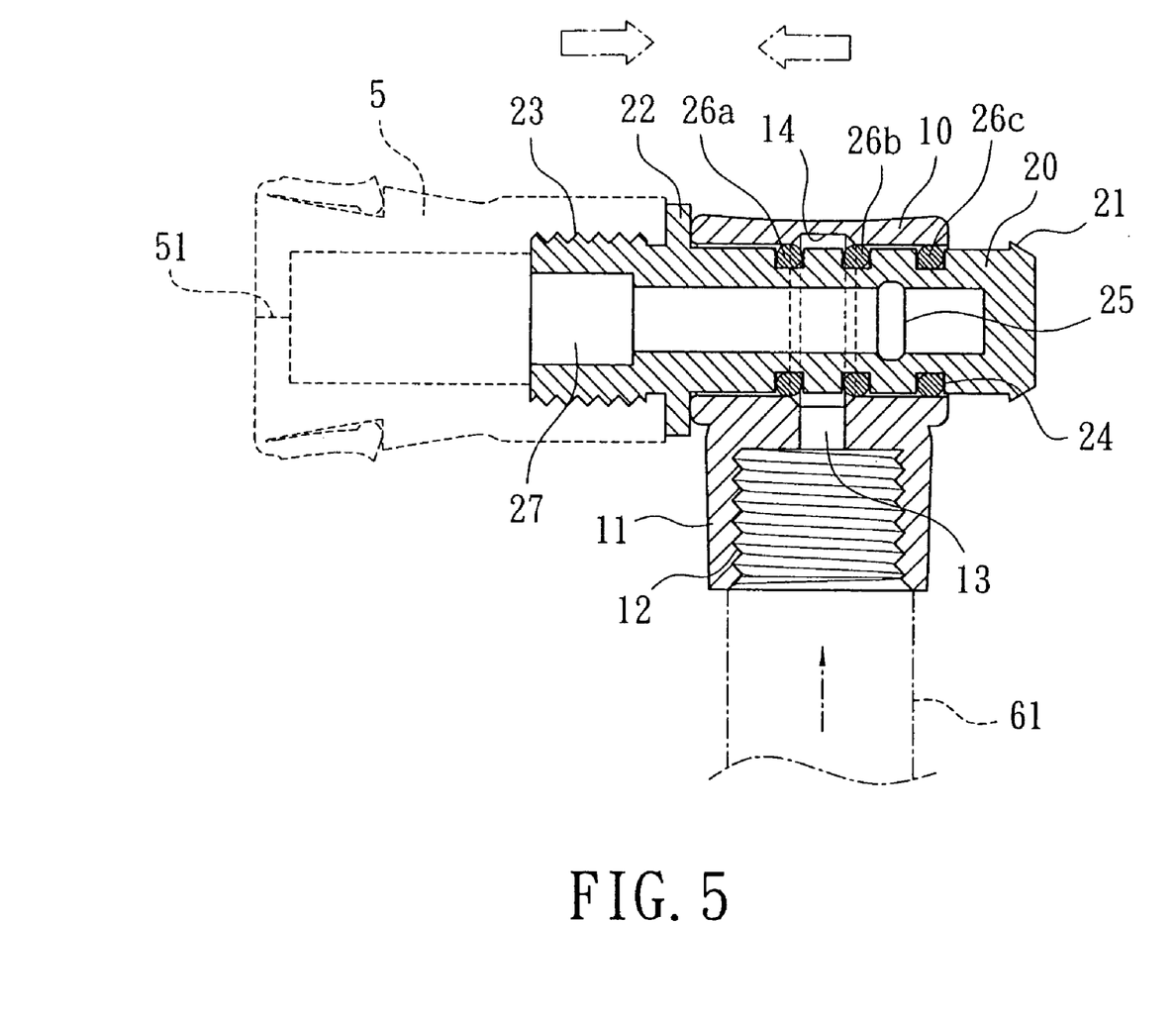
FIG. 5 is a schematic view showing the status when water is stopped inside of the invention.

It is worth mentioning that the number of the peripheral grooves 24 provided can alternatively be two; the peripheral grooves 24 are respectively provided at the right and left sides of the opening 25 for blocking the tiny interval between the walls of the casing 10 and the hollow pipe 20. However, under the circumstances that the interior wall of the casing 10 has a size close to that of the exterior wall of the hollow pipe 20, as shown in FIG. 5, while the openings 13 and 25 do not closely meet each other, the water can be stopped only if the opening 25 is detached from the hollow flow path 14. As such, the number of the peripheral grooves 24 provided must not necessarily be three. Besides, while in the embodiment according to the invention, each peripheral groove 24 is mounted with an O-ring (26a, 26b, 26c), the O-ring can alternatively be replaced by a flange extruding from the periphery of the hollow pipe 20, such that the outer diameter of the flange is slightly greater than the interior diameter of the casing 10, thereby when the hollow pipe 20 is inserted into the casing 10, they can interfere and harmony with each other to prevent from leaking as serviceable as an O-ring.

When the hollow pipe 20 is inserted into the casing 10, there forms a specific angle between each other. As shown in the figures, there is a 90-degree angle in the embodiment of the invention. However, if the angle formed between the hollow flow path 14 of the casing 10 and the coupler 11 is provided as an angle not of 90 degrees (for example, 60~135 degrees), said angle will be formed between the hollow pipe 20 and the casing 10 after combination.

Figure 4:
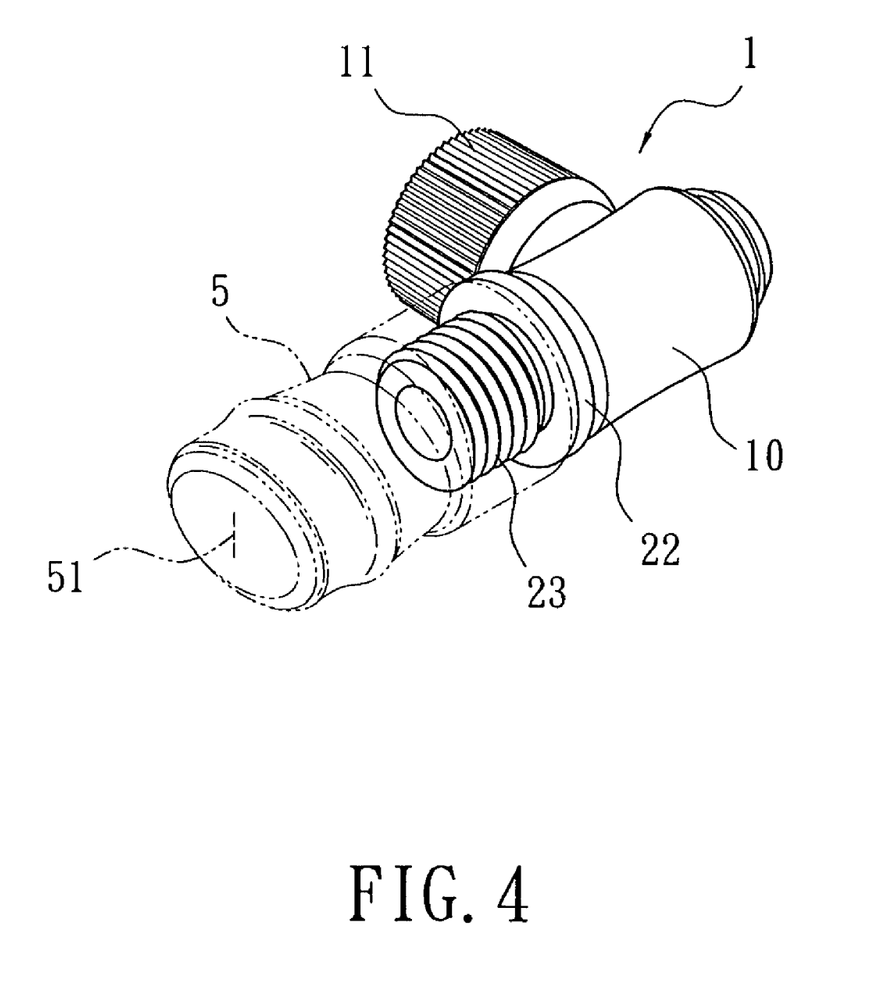
FIG. 4 shows the invention in combination with a nozzle.
Figure 8:
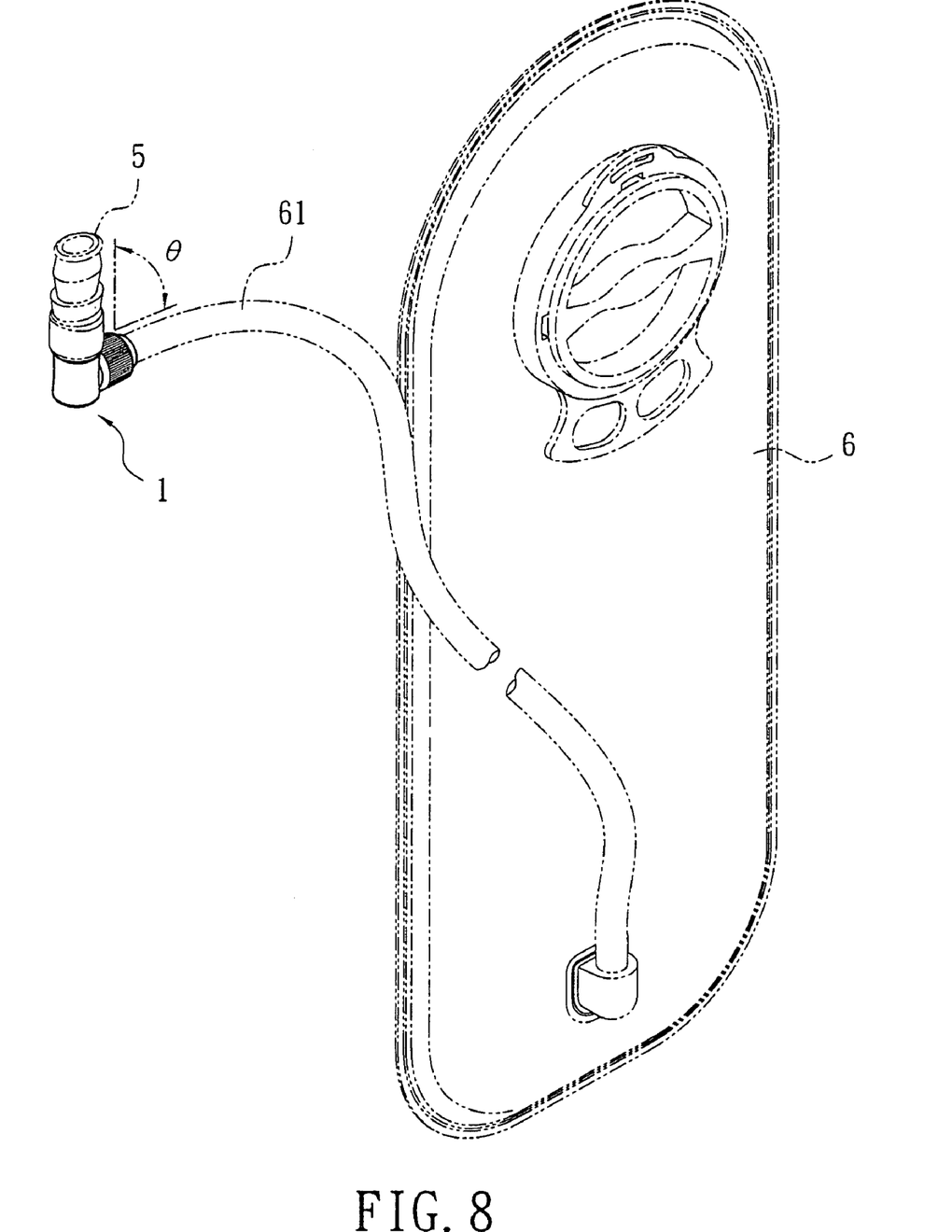
FIG. 8 shows an embodiment of the invention in use.

Referring to FIGS. 4 and 8, in the outfall valve 1 according the invention, an outlet crevice 51 is provided at the front end of the nozzle 5 upon the combination of the exterior threads 23 of the hollow pipe 20 and the nozzle 5. After the coupler 11 of the casing 10 is combined with a water conduit 61 of a water bag (as shown in FIG. 8), an angle θ will be formed between the nozzle 5 and the water conduit 61 at is set as 90 degrees in the embodiment shown in the figures.), such that the user can easily hold the water conduit 61 and bite the nozzle 5 at the right position without bending the water conduit 61 by force in order to bite the front end of the nozzle, as is using the structure of the prior art.

Referring to FIG. 5, given that the water is to be stopped, to prevent water from leaking out of the outlet crevice 51, the barrier edge 22 of the hollow pipe 20 can be placed against the casing 10, therefore the opening 25 provided on the hollow pipe 20 will stagger from the opening 13 of the casing 10 and detach out of the peripheral hollow flow path 14, thereby the two openings 13, 25 will be barred by the exterior wall of the hollow pipe 20 and the interior wall of the casing 10, respectively. Besides, the two O-rings 26a and 26c will seal the crevice between the two end walls to prevent the liquid contained therein from leaking out of the valve.

Figure 6:
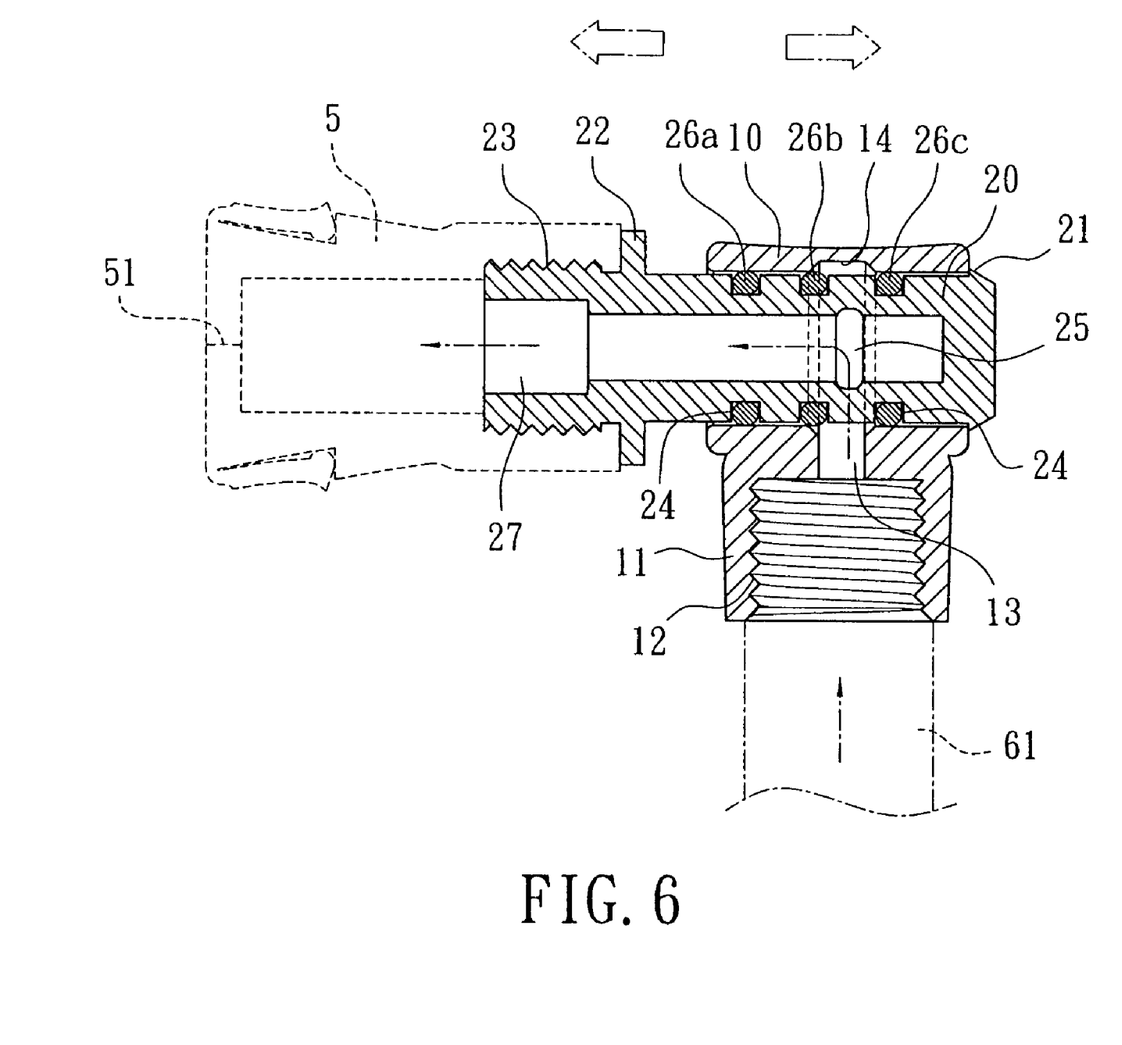
FIG. 6 is a schematic view showing the status when water is flowing outside of the invention.

Referring to FIG. 6, given that the water is to be released, the user can bite the nozzle 5 and pull it forwardly, thereby the nozzle 5 will be screwed with the exterior threads 23 of the hollow pipe 20, and allow the hollow pipe 20 to displace forwardly and the casing 10 relatively be moved backwardly by hand. Such a displacement can permit the two openings 13, 25 to displace to a position where they closely meet together. And the opening 25 will move into the peripheral hollow flow path 14 and form a through way between the water conduit 61 and the nozzle 5. When the user bites the nozzle 5 and make the outlet crevice 51 at the front end of the nozzle 5 opened, he/she can drink the water inside of the water bag.

The above descriptions have depicted the operation of the outfall valve 1 according to the invention in terms of how to control the water to outflow and stop. A further function of the outfall valve 1 according to the invention is that it can be rotated in a 360-degree angle. As the nozzle 5, outfall valve 1 and the water conduit 61 are each screwed together via threads, the out let crevice 51 of the nozzle 5 must not necessarily be vertical to make the user easily bite the nozzle 5.

Figure 7:
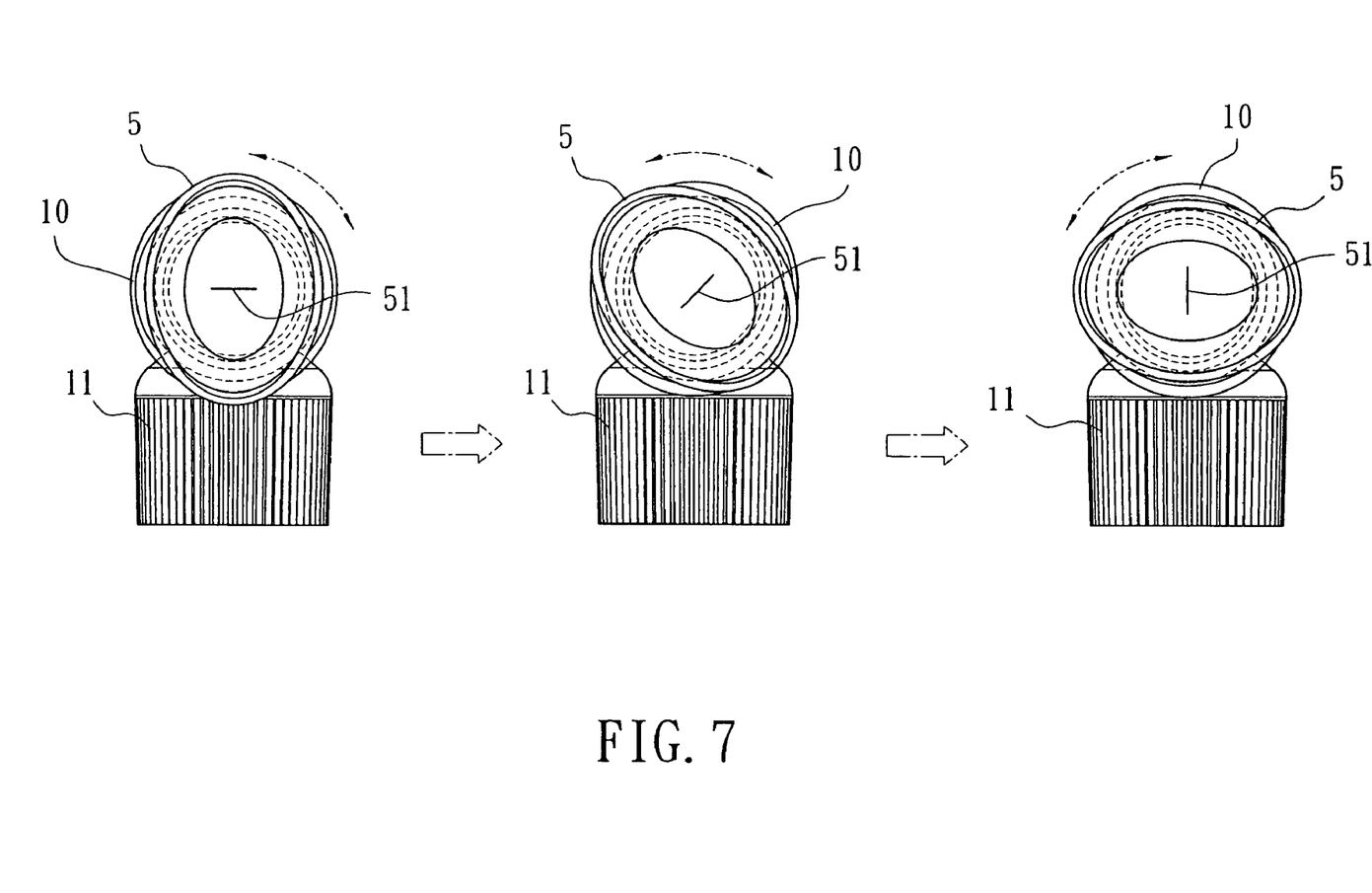
FIG. 7 shows the rotation of the hollow pipe when combining with the nozzle.

Referring to FIGS. 7 and 8, the hollow pipe 20 combining with the nozzle can freely rotate inside of the casing 10, since the hollow pipe 20 is in the form of a circular pipe. While the hollow pipe 20 is provided with an O-ring (26a, 26b, 26c) on each peripheral groove 24 of the periphery, the hook 21 at eh rear end of the hollow pipe 20 can be locked at one end of the casing 10 without detaching. Under the circumstance that the user pulls the nozzle 5 close to his/her mouth, and that the outlet crevice 51 at the front end of the nozzle 5 does not preferably appear vertical, he/she can freely switch the nozzle 5 to make the hollow pipe 20 on the nozzle 5 rotate inside of the casing 10. Meanwhile, the pluralities of O-rings (26a, 26b, 26c) will become leak-proof at the time rotating. The outlet crevice 51 will then be adjusted to a vertical direction to ease the user to bite on. At this time, given the water is to let outflow, the user need simply pull the hollow pipe 20 forwardly and make the casing 10 move backwardly to lean on the hook 21, thereby the opening 25 of the hollow pipe 20 and the opening 13 of the casing 10 would stack up (as shown in FIG. 6). Upon application of pressure onto the nozzle 5 to allow the outlet crevice 51 open, the nozzle 5, outfall valve 1 and water conduit 61 will form a path, and the user can easily drink the liquid inside of the water bag.

Accordingly, the structure according to the invention has the following advantages:

1. The outfall valve according the invention can allow an angle formed between the nozzle and the water conduit. When in use, the user need simply pull the water conduit to the height of the mouth, he/she can reach the nozzle without bending the water conduit by force, as is with the products of the prior art.

2. The hollow pipe inserted into the casing can be freely rotated. Therefore, when the nozzle is connected to the outfall valve, if the outlet crevice doest not appear a right direction, the user can simply rotate the hollow pipe to adjust the outlet crevice of the nozzle to a prefer direction for biting.

3. By way of the combination of the outlet valve, the water conduit need not be bended for use, thereby the flow rate of the liquid contained in the water bag would not be affected, and user can drink the liquid easily.

4. Given that the outlet valve is not in use, the openings of the casing and the hollow pipe would be barred by the exterior wall of the hollow pipe and the exterior wall of the casing. As the flow path disappears, the nozzle is definitely leak-proof.

Although specific embodiments have been illustrated and described, it will be obvious to those skilled in the art that various modifications may be made without departing from what is intended to be limited solely by the appended claims.

Concluded from above, the invention discloses an innovated nozzle conforming to ergonomics, which is novel and rich of commercial value as claimed by the inventor.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An outfall valve comprising:

a casing having an exterior wall provided with a coupler, an inner end of said coupler being provided with a first opening, a circle of hollow flow path being provided along said first opening;

a hollow pipe connected with said casing and having a first end provided with a hook and a second end provided with a plurality of exterior threads, said hollow pipe being rotatable in 360 degrees with respect to said casing, a barrier edge being protrudingly provided adjacent said threads, a second opening going through an interior flow path of said hollow pipe, a first peripheral groove provided between said barrier edge and said hook and positioned at one side of said second opening, a second and third peripheral grooves provided between said barrier edge and said hook and positioned at another side of said second opening, each of said peripheral grooves being mounted with an O-ring, said hollow pipe being slidably fitted in said casing and movable between said barrier edge and said hook, combination of said casing and said hollow pipe forming an angle from 60 to 135 degrees; and a nozzle engaged with said exterior threads of said second end of said hollow pipe, said nozzle having a front end provided with a crevice.

2. The outfall valve as claimed in claim 1, wherein said coupler has an interior wall provided with threads.

* * * * *